US006888097B2

(12) United States Patent
Batarseh

(10) Patent No.: US 6,888,097 B2
(45) Date of Patent: May 3, 2005

(54) FIBER OPTICS LASER PERFORATION TOOL

(75) Inventor: Samih Batarseh, Mount Prospect, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 10/601,750

(22) Filed: Jun. 23, 2003

(65) Prior Publication Data

US 2004/0256103 A1 Dec. 23, 2004

(51) Int. Cl.[7] .......................... B23K 26/38; B23K 26/14
(52) U.S. Cl. ..................................... 219/121.7; 175/11
(58) Field of Search ........................ 219/121.7, 121.73, 219/121.6, 121.75; 606/15, 16, 18; 175/11

(56) References Cited

U.S. PATENT DOCUMENTS

| | | | | |
|---|---|---|---|---|
| 3,693,718 A | * | 9/1972 | Stout ........................... 166/302 |
| 3,843,865 A | * | 10/1974 | Nath ........................ 219/121.6 |
| 4,282,940 A | * | 8/1981 | Salisbury et al. .............. 175/11 |
| 4,881,524 A | * | 11/1989 | Boebel et al. ............... 600/108 |
| 4,997,250 A | * | 3/1991 | Ortiz, Jr. ....................... 385/33 |
| 6,379,347 B1 | * | 4/2002 | Maki et al. .................... 606/17 |
| 6,491,689 B1 | * | 12/2002 | Ellis et al. ..................... 606/15 |
| 6,755,262 B2 | * | 6/2004 | Parker .......................... 175/57 |
| 2003/0139735 A1 | * | 7/2003 | Neuberger ...................... 606/3 |
| 2003/0199860 A1 | * | 10/2003 | Loeb et al. .................... 606/17 |
| 2003/0226826 A1 | * | 12/2003 | Kobayashi et al. ...... 219/121.7 |

\* cited by examiner

Primary Examiner—Geoffrey S. Evans
(74) Attorney, Agent, or Firm—Mark E. Fejer

(57) ABSTRACT

An apparatus for perforation of wellbore walls, which apparatus includes a fiber optic cable having a laser input end and a laser output end. A laser source is operably connected to the laser input end and a laser head is connected to the laser output end. The laser head includes a laser control components for controlling at least one laser beam characteristic. Laser head control elements for controlling the motion and location of the laser head are operably connected to the fiber optic cable. The laser head is enclosed in a protective housing, which protects the fiber optic cable and elements, such as reflectors and lenses for controlling the laser beam emitted by the fiber optic cable disposed therein, from the harsh environments encountered in downhole operations.

15 Claims, 4 Drawing Sheets

FIBER OPTICS LASER PERFORATION TOOL

BACKGROUND OF THE INVENTION

1. Field of the Invention

This invention relates to a method and apparatus for completion of oil, gas and/or hydrothermal wells. More particularly, this invention relates to the application of laser energy for initiating or promoting the flow of a desired resource, e.g. oil, into a wellbore, referred to herein as well completion.

2. Description of Related Art

Once the drilling of a well has been completed, fluid flow into the well is initiated by perforation of the well casing or liner. Such perforations are created using bullets or shaped charges for establishing flow of oil or gas from the geologic formations into the wellbore. The perforations typically extend a few inches into the formation. However, there are numerous problems with this approach. First, the melt from shaped charges or debris from the bullet impact usually reduces the permeability of the producing formations resulting in a substantial reduction in production rate. Second, these techniques involve the transportation and handling of high power explosives and are causes of serious safety and security concerns. Third, the impact of the bullet into the formation also produces fine grains that can plug the pore throat, thereby reducing the production rate.

SUMMARY OF THE INVENTION

Accordingly, it is one object of this invention to provide a method and apparatus for perforating the well casing of a wellbore which provides a clean and extended tunnel for the fluid to flow into the well.

It is a further object of this invention to provide a method and apparatus for perforating the well casing of a wellbore which eliminates safety and security risks.

It is yet a further object of this invention to provide a method and apparatus for perforating the well casing of a wellbore which eliminates the damage to formations which reduces fluid production arising from the use of conventional perforation techniques.

It is another object of this invention to provide a method and apparatus for perforating the well casing of a wellbore which results in the formation of a long and clean flow path between the fluid reservoir and the wellbore.

These and other objects of this invention are addressed by a high power laser disposed above ground coupled with a fiber optic cable that transmits laser energy downhole. On the end of the fiber optic cable is a mechanical means that allows for precise control over the motion and location of the fiber optic cable. Such mechanical means are capable of maintaining the cable steady in the center of the hole, or at any other specific location. After the laser penetrates the wellbore casing and cement, the fiber optic cable can be transported through each medium into the actual hole, allowing for the creation of a much deeper perforation. The apparatus is capable not only of drilling deeper into the perforated opening, but also of acting upon the surface of the perforation. Different types of laser treatments can be employed to yield fully vaporized (high permeability), porous melt (moderate permeability) or sealed (impermeable) rock layers. These different treatments are required to cope with the different strengths and stabilities of the rock formations encountered. The desired results can be obtained by manipulating simple laser parameters, such as laser power and exposure time.

More particularly, the apparatus of this invention comprises a fiber optic cable having a laser input end and a laser output end. A laser source is operably connected to the laser input end of the fiber optic cable, which is typically disposed above ground, thereby avoiding limitations as to size, weight, etc. A laser head, enclosed in a protective housing, is connected to the laser output end of the fiber optic cable and comprises laser control means for controlling at least one laser beam characteristic, such as beam direction, beam focusing and beam splitting. Laser head control means for controlling the motion and location of the laser head are operably connected to the fiber optic cable.

In operation, in accordance with the method of this invention, after completion of the well boring operation, the laser output end of a fiber optic cable having a laser input end and a laser output end is lowered down into the wellbore by means of a mechanical transportation device. Once downhole, a laser head operably connected to the laser output end of the fiber optic cable is oriented so as to aim a laser beam emitted by the laser output end of the fiber optic cable toward the casing of the wellbore. Depending upon the laser power employed, the wellbore casing, as well as the cement layer separating the casing from the surrounding rock formation, is melted or vaporized, resulting in creation of an initial perforation hole. After formation of the initial perforation hole, other holes may be created in alternate locations, or the initial perforation hole may be deepened utilizing the mobility of the fiber optic cable. Inside the perforation, different treatments may be applied to yield zones of suitable permeability.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
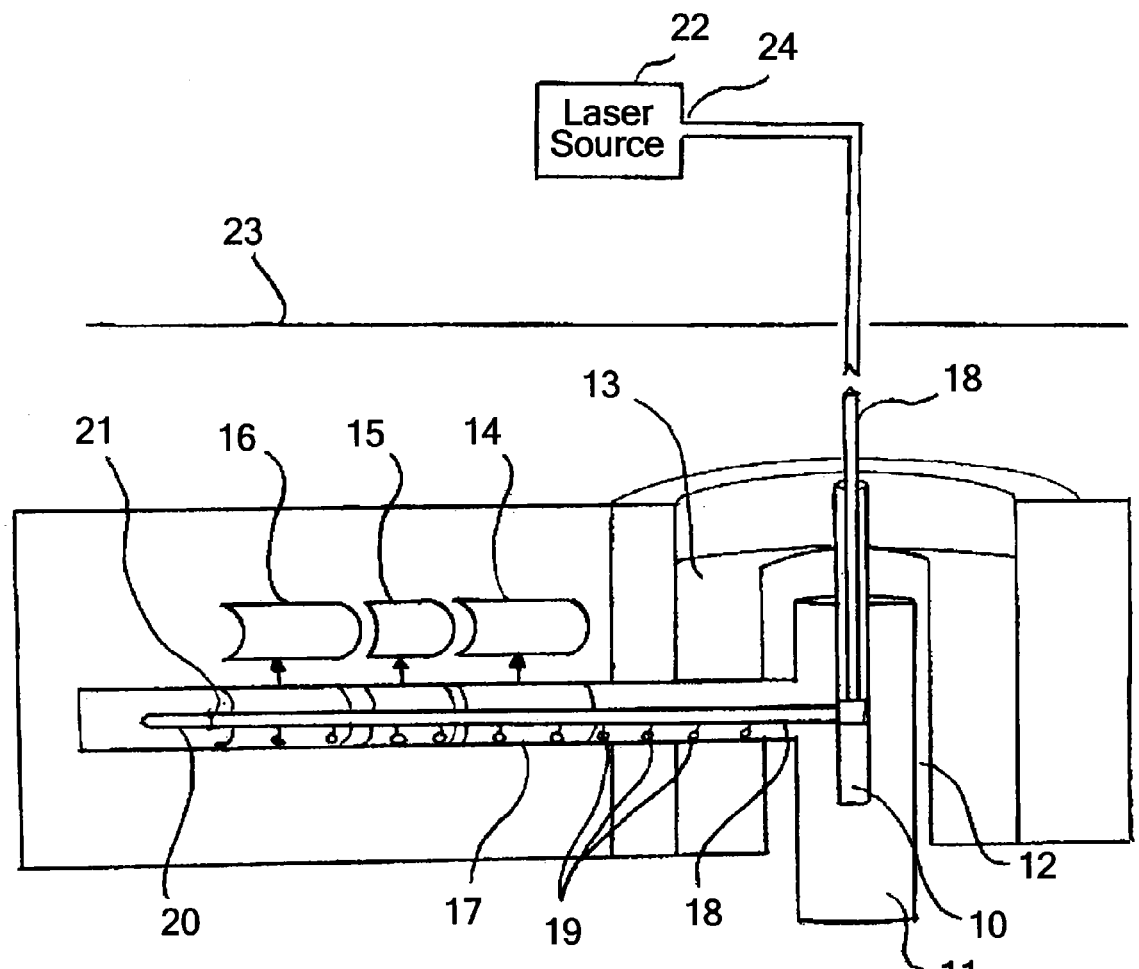
FIG. 1 is a simplified diagram showing a fiber optics laser perforation apparatus in accordance with one embodiment of this invention disposed within a wellbore perforation.

FIG. 1 shows a fiber optic laser perforation tool in accordance with one embodiment of this invention disposed within a wellbore 10 and extending through casing 11, cement 12 and rock formation 13 into tunnel 17. As shown, the fiber optic laser perforation tool comprises a fiber optic cable 18 having a laser input end 24 and a laser output end 21. Attached to laser input end 24 is a laser source 22, which is disposed above the ground 23. By virtue of this arrangement, there are no physical limitations, such as weight and size, on the downhole portion of the tool. The fiber optic laser perforation tool comprises two inputs (not shown), one of which provides power for the motion system and the other of which provides power for the laser.

Figure 2:
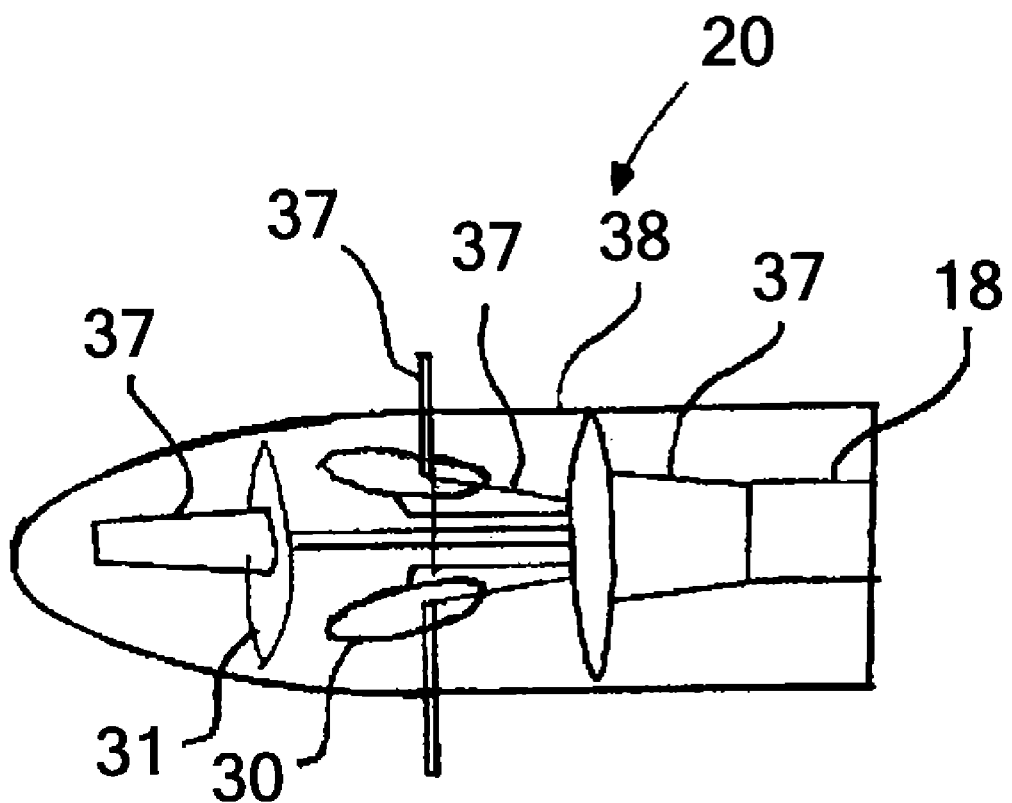
FIG. 2 is a schematic diagram of a lateral view of a laser head for a fiber optics laser perforation tool in accordance with one embodiment of this invention.
Figure 3:
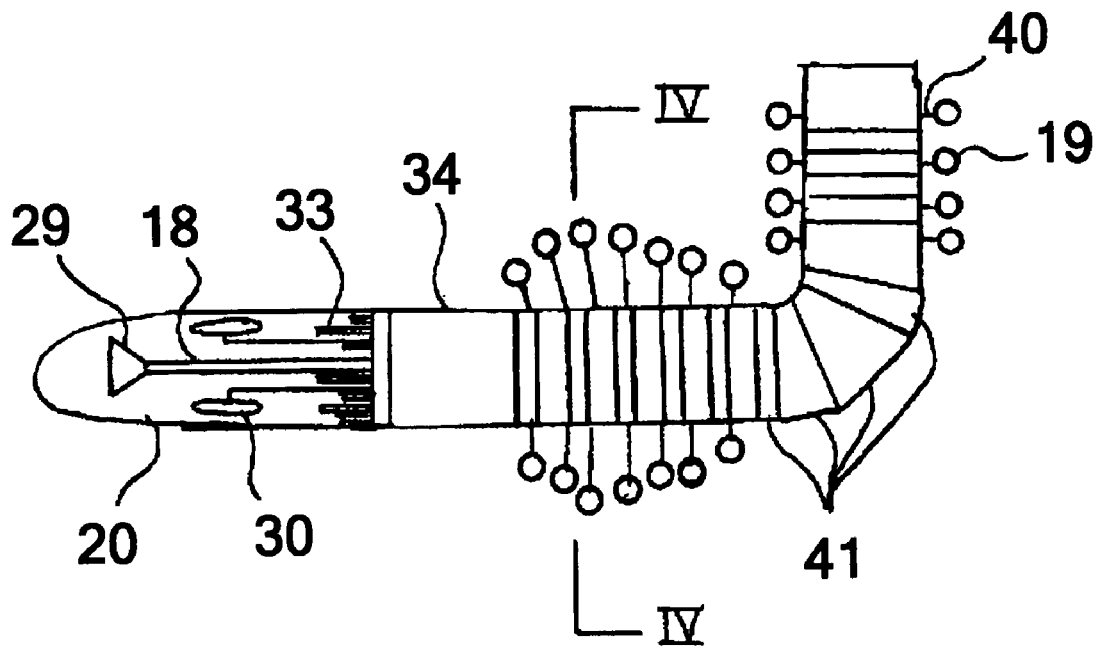
FIG. 3 is a schematic lateral view of a downhole portion of a fiber optics laser perforation tool in accordance with one embodiment of this invention.

Connected to laser output end 21 of fiber optic cable 18 is laser head 20, the details of which are shown in FIGS. 2 and 3. Laser head 20 comprises a housing 38, which, in accordance with one preferred embodiment of this invention, is a transparent housing typically formed of a glass or sapphire material. Laser output end 21 of fiber optic cable 18 is operably connected to transparent housing 38, whereby a laser beam 37 emitted from said laser output end 21 is directed into transparent housing 38. Disposed within transparent housing 38 is at least one laser beam directing means for focusing and aiming the direction of the laser beam 37. In accordance with one embodiment of this invention, said directing means comprises at least one movable reflector, e.g. mirror 30, whereby the laser beam 37 may be directed laterally outward from the housing as shown in FIG. 2. In accordance with a further embodiment of this invention, at least one lens 31 is disposed within transparent housing 38, which lens is adjustable to enable precise focusing and direction of laser beam 37. It should be noted that the only requirements with respect to the use and disposition of reflectors and lenses within the transparent housing are that the arrangement thereof permits splitting and/or redirecting of the laser beam 37 in any direction by means of rotation and adjustment of the lenses and reflectors.

One of the requirements for achieving the objects of this invention is precise control over the motion and location of the fiber optic cable 18 within wellbore 10 and tunnel 17. This requirement is addressed in accordance with one embodiment of this invention as shown in FIG. 3 wherein a plurality of spherical wheels 19, or other suitable locomotion means, are connected directly or indirectly to the exterior surface of fiber optic cable 18. Spherical wheels are particularly preferred because they allow for both rotational and directional mobility. Also provided are means for sensing the orientation of the fiber optic cable within the wellbore 10 and tunnel 17. Any suitable means including visual means may be employed for this purpose. Preferably, spherical wheels 19 are mounted on retractable mechanical arms 40 to control the location of the apparatus within the wellbore 10 and tunnel 17. In addition, the use of retractable mechanical arms 40 provides the capability of holding the fiber optical cable 18 steady in the center of the wellbore and/or tunnel, or at any other specific location.

After penetration of the casing 11 and cement 12 by the laser beam, fiber optic cable 18 can be transported through each type of medium that may be encountered, thereby enabling the creation of a substantially deeper perforation/tunnel 17. In addition to being able to drill a longer tunnel 17, the apparatus of this invention is also able to act upon the surface of the tunnel 17 depending upon the power of the laser treatment employed to produce varying degrees of permeability. For applications in which high permeability is desired, the power and exposure time of the laser energy employed must be sufficient to vaporize the underground media encountered, forming a vaporized zone, represented by reference numeral 16 in FIG. 1. For moderate permeability, a lesser amount of laser energy is employed, which is sufficient to soften or melt the underground media, forming a permeable melt zone, represented by reference numeral 14. For rendering the rock formation 13 impermeable, an even lesser amount of laser energy is employed, forming a seal zone, represented by reference numeral 15. These different levels of treatments are necessary to cope with the different strengths and stabilities of rock formations encountered.

In accordance with one embodiment of this invention as shown in FIG. 3, a plurality of nozzles 33 are disposed around laser head 20. In accordance with one embodiment of this invention, nozzles 33 are purging nozzles provided for the purpose of removing dust or other particles from the exterior surface of transparent housing 38 and for controlling the ceramic or phase of the rock in the vicinity of the housing. Suitable purging fluids may be gas, such as high pressure air, or liquids. In accordance with another embodiment of this invention, at least a portion of nozzles 33 are vacuum nozzles connected to a vacuum source and adapted to remove gaseous fluids from around the exterior of transparent housing 38.

Figure 4:
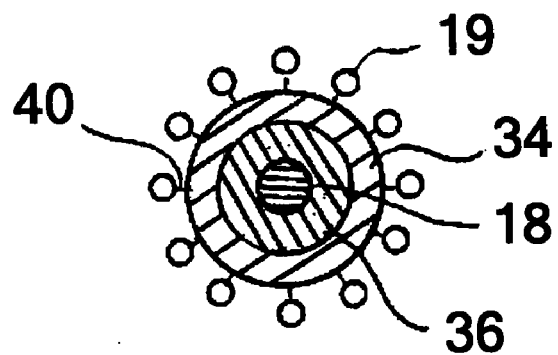
FIG. 4 is a schematic diagram of the downhole portion of the fiber optics laser perforation tool shown in FIG. 3 taken along the line IV—IV.
Figure 5:
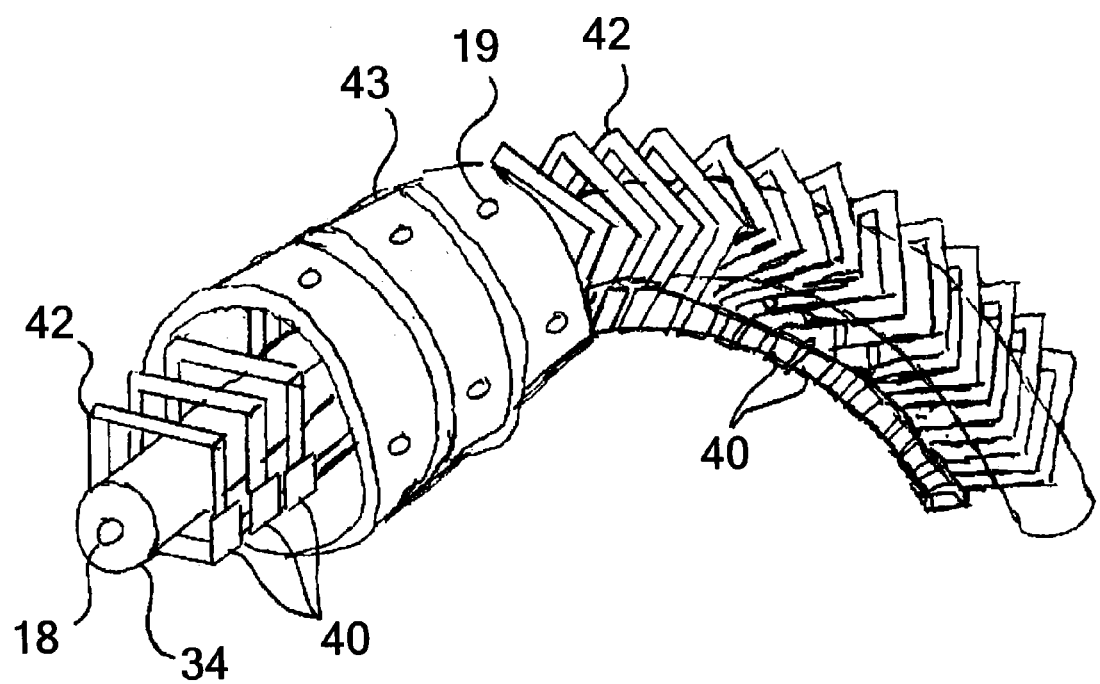
FIG. 5 is a diagram showing a fiber optics laser perforation tool having protective maneuverable couplings for providing flexibility in accordance with one embodiment of this invention.

Successful employment of the tool requires that the fiber optic cable be highly flexible and able to withstand the high temperatures encountered downhole. This latter requirement is fulfilled by a thermally protective shielding 36, as shown in FIG. 4, disposed around the fiber optic cable 18. In accordance with one preferred embodiment of this invention, the shielding is constructed in a manner that allows for twisting and bending. As shown in FIG. 3, the shielding 36 comprises a subdivided casing 34 that allows neighboring segments 41 to bend. In an alternative embodiment shown in FIG. 5, shielded fiber optic cable 18 is surrounded by a maneuverable system of interlocking braces 42 connected by free-sliding connectors 40. The maneuverable system, in turn, is surrounded by a flexible outer casing 43 that provides mountings for retractable spherical wheels 19.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. An apparatus comprising:
perforation means for perforating a wellbore wall, said perforation means comprising a fiber optic cable having a laser input end and a laser output end, a laser source operably connected to said laser input end, a laser head connected to said laser output end, said laser head comprising laser control means for controlling at least one laser beam characteristic, laser head control means for controlling a motion and a location of said laser head operably connected to said fiber optic cable, and a protective housing enclosing said laser head.

2. An apparatus in accordance with claim 1, wherein said protective housing is transparent.

3. An apparatus in accordance with claim 1, wherein a thermally protective shielding is disposed around said fiber optic cable.

4. An apparatus in accordance with claim 1, wherein said laser head control means comprises a plurality of roller elements operably connected to said fiber optic cable.

5. An apparatus in accordance with claim 4, wherein said roller elements are selected from the group consisting of spheres, wheels and combinations thereof.

6. An apparatus in accordance with claim 5, wherein said roller elements are connected to said fiber optic cable by extension means for extending said roller elements outward from said fiber optic cable.

7. An apparatus in accordance with claim 1, wherein said laser control means comprises at least one of directing means for directing a laser beam transmitted from said laser output end, focusing means for focusing said laser beam and splitting means for splitting said laser beam.

8. An apparatus in accordance with claim 7, wherein said directing means comprises at least one adjustable reflector suitable for reflecting said laser beam outwardly from said laser head.

9. An apparatus in accordance with claim 8, wherein said at least one reflector is selected from the group consisting of mirrors, crystal reflectors and combinations thereof.

10. An apparatus in accordance with claim 1 further comprising a plurality of nozzles disposed around an exterior of said laser head.

11. An apparatus in accordance with claim 10, wherein at least a portion of said plurality of nozzles are purge nozzles connected to a purge fluid supply and adapted to deliver a purge fluid proximate said exterior of said laser head.

12. An apparatus in accordance with claim 10, wherein at least a portion of said plurality of nozzles are vacuum nozzles connected to a vacuum source and adapted to remove gaseous fluids from around said exterior of said laser head.

13. An apparatus in accordance with claim 1, wherein said laser head control means comprises a plurality of protective couplings disposed around said fiber optic cable.

14. An apparatus in accordance with claim 13, wherein a flexible outer casing is disposed around said plurality of protective couplings.

15. An apparatus in accordance with claim 14, wherein said laser head control means further comprises a plurality of roller elements connected to said flexible outer casing.

* * * * *